United States Patent
Schuck et al.

(10) Patent No.: US 8,425,041 B2
(45) Date of Patent: *Apr. 23, 2013

(54) STEREOSCOPIC PROJECTION SYSTEMS FOR EMPLOYING SPATIAL MULTIPLEXING AT AN INTERMEDIATE IMAGE PLANE

(75) Inventors: Miller H. Schuck, Boulder, CO (US); Michael G. Robinson, Boulder, CO (US); Douglas J. McKnight, Boulder, CO (US); Gary D. Sharp, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 591 days.

This patent is subject to a terminal disclaimer.

(21) Appl. No.: 12/629,017

(22) Filed: Dec. 1, 2009

(65) Prior Publication Data

US 2010/0141856 A1 Jun. 10, 2010

Related U.S. Application Data

(60) Provisional application No. 61/119,014, filed on Dec. 1, 2008, provisional application No. 61/249,018, filed on Oct. 6, 2009, provisional application No. 61/256,854, filed on Oct. 30, 2009.

(51) Int. Cl.
   *G03B 21/00* (2006.01)
(52) U.S. Cl.
   USPC .......... 353/7; 353/8; 353/20; 353/31; 353/34; 353/98; 349/5; 349/8; 349/9; 359/462; 359/464
(58) Field of Classification Search .................. 353/7–9, 353/20, 31–34, 37–38, 70, 81, 98–99, 121; 349/5, 7, 8, 9, 57; 348/51–54, 57; 359/462, 359/464, 465, 466, 476, 477
See application file for complete search history.

(56) References Cited

U.S. PATENT DOCUMENTS

| 2,513,176 A | 6/1950 | Homrighous |
| 3,825,328 A | 7/1974 | Hoch |
| 3,943,344 A | 3/1976 | Kidode et al. |

(Continued)

FOREIGN PATENT DOCUMENTS

| EP | 1337117 A1 | 8/2003 |
| GB | 2317524 | 3/1998 |
| WO | 2006038744 | 4/2006 |
| WO | 2008141247 | 11/2008 |

OTHER PUBLICATIONS

International search report and written opinion of the international searching authority in co-pending PCT/US10/040429 dated Feb. 10, 2011.

(Continued)

*Primary Examiner* — Georgia Y Epps
*Assistant Examiner* — Sultan Chowdhury
(74) *Attorney, Agent, or Firm* — Baker & McKenzie LLP

(57) ABSTRACT

Proposed are various embodiments of projection systems that generally provide stereoscopic images. The projection systems act to split a spatially separated image in a stereoscopic image frame and superimpose the left- and right-eye images on a projection screen with orthogonal polarization states. The embodiments are generally well suited to liquid crystal polarization based projection systems and may use advanced polarization control.

26 Claims, 10 Drawing Sheets

U.S. PATENT DOCUMENTS

| | | | |
|---|---|---|---|
| 4,464,028 A | 8/1984 | Condon | |
| 4,915,497 A | 4/1990 | Loth et al. | |
| 5,481,321 A | 1/1996 | Lipton | |
| 5,517,340 A * | 5/1996 | Doany et al. | 349/5 |
| 5,716,122 A | 2/1998 | Esaki et al. | |
| 5,751,384 A | 5/1998 | Sharp | |
| 5,902,030 A * | 5/1999 | Blanchard | 353/30 |
| 5,930,050 A | 7/1999 | Dewald | |
| 6,034,818 A * | 3/2000 | Sedlmayr | 359/283 |
| 6,439,725 B1 * | 8/2002 | Na | 353/31 |
| 6,603,876 B1 | 8/2003 | Matsuo et al. | |
| 7,044,607 B2 * | 5/2006 | Ouchi et al. | 353/31 |
| 7,357,510 B2 * | 4/2008 | Kim et al. | 353/7 |
| 7,606,485 B2 | 10/2009 | Ohashi | |
| 2001/0021004 A1 * | 9/2001 | Yano | 353/31 |
| 2002/0005820 A1 | 1/2002 | Son et al. | |
| 2002/0191235 A1 * | 12/2002 | O'Connor et al. | 359/9 |
| 2004/0212882 A1 | 10/2004 | Liang et al. | |
| 2006/0087734 A1 | 4/2006 | Weissman | |
| 2006/0109753 A1 | 5/2006 | Fergason | |
| 2006/0114415 A1 * | 6/2006 | Shestak et al. | 353/7 |
| 2007/0132953 A1 | 6/2007 | Silverstein | |
| 2007/0273761 A1 | 11/2007 | Maruyama et al. | |
| 2007/0273798 A1 | 11/2007 | Silverstein et al. | |
| 2008/0117493 A1 | 5/2008 | Penn | |
| 2009/0079885 A1 * | 3/2009 | Hsu et al. | 348/756 |
| 2009/0086016 A1 | 4/2009 | Su | |

OTHER PUBLICATIONS

International search report and written opinion of the international searching authority in co-pending PCT/US09/66292 mailed Jul. 20, 2010 to Applicant ReaID Inc.

Lipton, L., "Foundations of the Stereoscopic Cinema," Van Nostrand-Reinhold (1982)[submitted electronically in two parts].

Robinson et al., "Polarization Engineering for LCD Projection," Ch. 6, Wiley & Sons (2004).

Smith, W., "Modern Optical Engineering," p. 272, McGraw-Hill (1990).

* cited by examiner

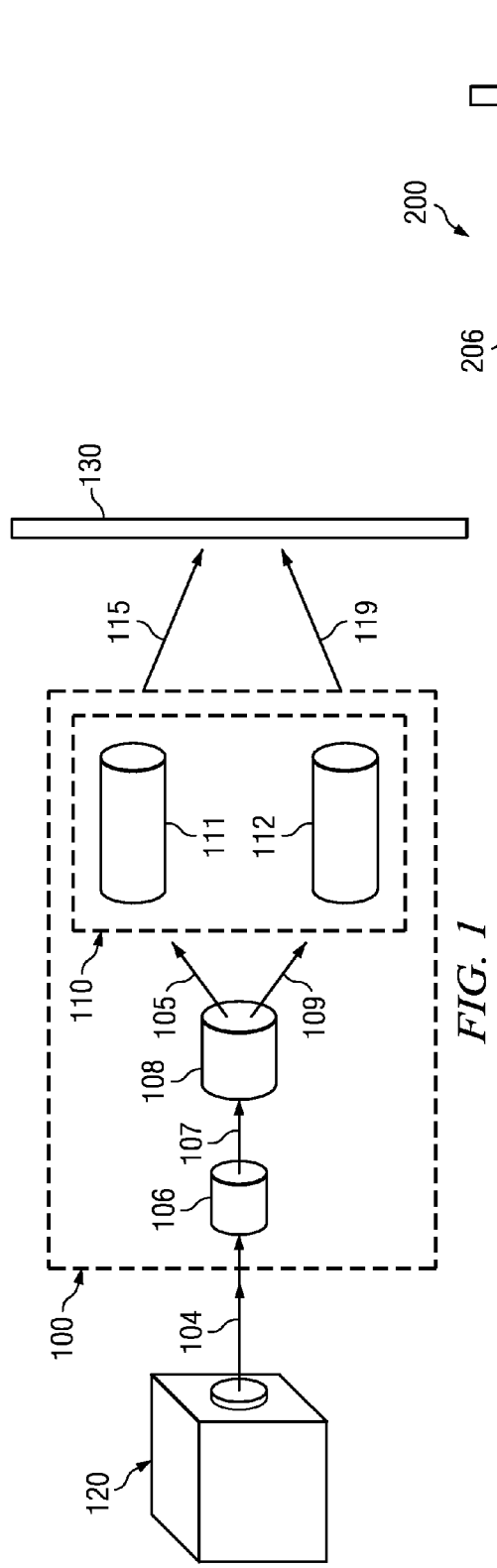
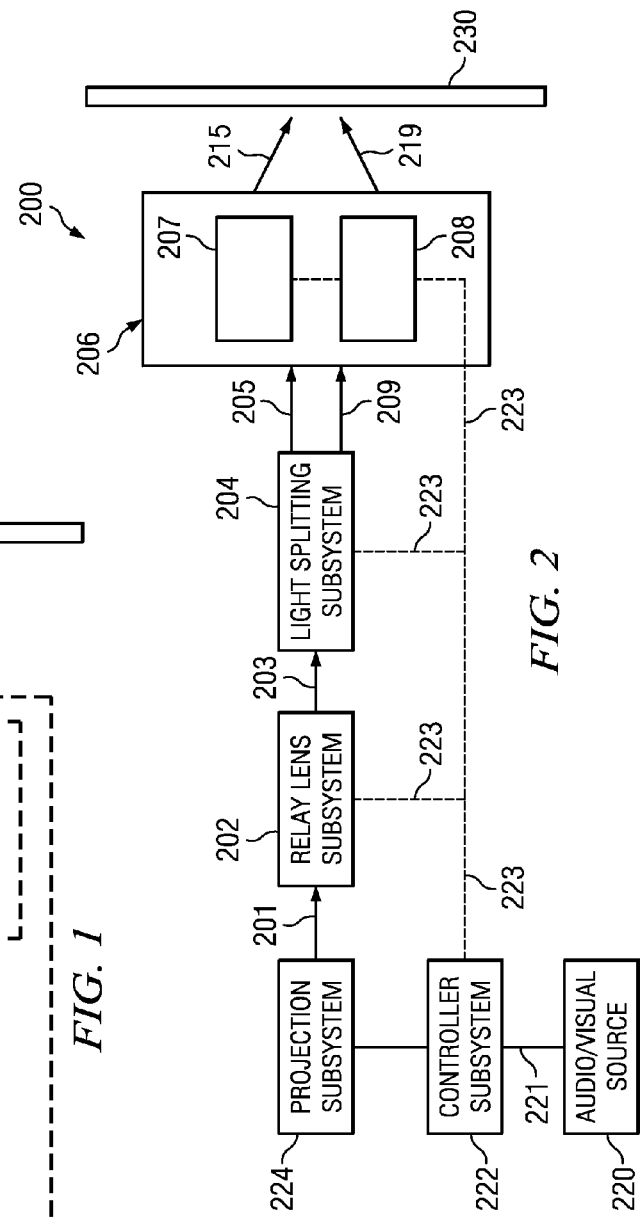

STEREOSCOPIC PROJECTION SYSTEMS FOR EMPLOYING SPATIAL MULTIPLEXING AT AN INTERMEDIATE IMAGE PLANE

CROSS REFERENCE TO RELATED APPLICATIONS

This patent application relates and claims priority to provisional patent application 61/119,014, entitled "Methods and systems for stereoscopic projection," to Robinson et al., filed Dec. 1, 2008, which is herein incorporated by reference. This patent application also relates and claims priority to provisional patent application 61/249,018, entitled "Stereoscopic projection system employing spatial multiplexing at an intermediate image plane," to Schuck et al., filed Oct. 6, 2009, which is also herein incorporated by reference. This patent application also relates and claims priority to provisional patent application 61/256,854, entitled "Stereoscopic projection system employing spatial multiplexing at an intermediate image plane," to Schuck et al., filed Oct. 30, 2009, which is also herein incorporated by reference.

BACKGROUND

1. Technical Field

The disclosed embodiments generally relate to stereoscopic projection systems and, more specifically, relate to stereoscopic projection systems that output polarization encoded left and right eye images.

2. Background

Stereoscopic projection dates back to the early $20^{th}$ century and was first seen in cinemas during the 1950s. These systems were film based and were limited mechanically to modest ~24 Hz frame rate. As such, it was not possible to use temporal methods of providing flicker-free sequential left and right eye images for stereoscopy. Spatially multiplexed image display systems were therefore implemented. Some comprised separate projectors while others employed a single projector with each frame comprising spatially separate left and right eye images. Complex frame dividing optics was used in this latter case to successfully superimpose the images on the screen. Many systems were developed and several commercially successful, as discussed by L. Lipton in *Foundations of the Stereoscopic Cinema*, Van Nostrand-Reinhold, Appendix 7, p. 260, 1982, which is hereby incorporated by reference. Unfortunately the quality of the stereoscopic experience was insufficient to draw customers leading to a reversal to 2D cinema in the latter half of the century.

Stereoscopic projection has recently been revitalized with high quality advanced digital equipment encompassing capture, distribution and display. To date the most successful projection system has been developed and installed by RealD. Based on Texas instruments Digital Light Processing (DLP) technology, systems provide time sequential left and right eye images at flicker free rates. Incorporating a polarization switch in the projection path provides sequential left and right eye images for viewing through passive polarizing eyewear. While the system based on DLP technology may provide good quality stereoscopic imagery, alternative projection platforms, such as those based on liquid crystal (LC) modulation, can also be considered. Desirable features of an LC projector-based platform are potentially providing improved resolution, motion rendition, and optical polarization efficiencies. Presently, a single LC projector does not however provide time-sequential images with sufficient frame rate to allow temporal left eye/right eye polarization modulation.

SUMMARY

Disclosed are stereoscopic projection systems and methods for stereoscopic projection.

Generally, according to an aspect, the stereoscopic projection systems may include a relay lens subsystem, a light splitting subsystem, and a projection lens subsystem. The relay lens subsystem is operable to receive a stereoscopic image frame from an input light path and convey the stereoscopic image frame to an intermediate image plane. The stereoscopic image frame may include first image area light and second image area light. The light splitting subsystem is operable to receive the stereoscopic image frame at the intermediate image plane and split the first and second image area light, to direct the first image area light on a first image light path, and to direct the second image area light on a second image light path. The projection lens subsystem is operable to direct the first and second image area light toward a screen.

According to another aspect, a method of stereoscopic projection may include optically receiving a stereoscopic image frame from a projector, splitting the first image area light from the second image area light, directing the first image area light on a first light path, directing the second image area light on a second light path, and focusing the first and second light path light toward a screen. The stereoscopic image frame includes first image area light and second image area light. In another aspect, the first image area light substantially overlaps with the second image area light.

Other aspects of the disclosure will be apparent with reference to the detailed description, the drawings, and the appended claims.

DETAILED DESCRIPTION OF THE DRAWINGS

FIG. 1 is a schematic diagram of a stereoscopic projection system, in accordance with the present disclosure;

FIG. 2 is a block diagram of a stereoscopic projection system, in accordance with the present disclosure;

DETAILED DESCRIPTION

Figure 3:
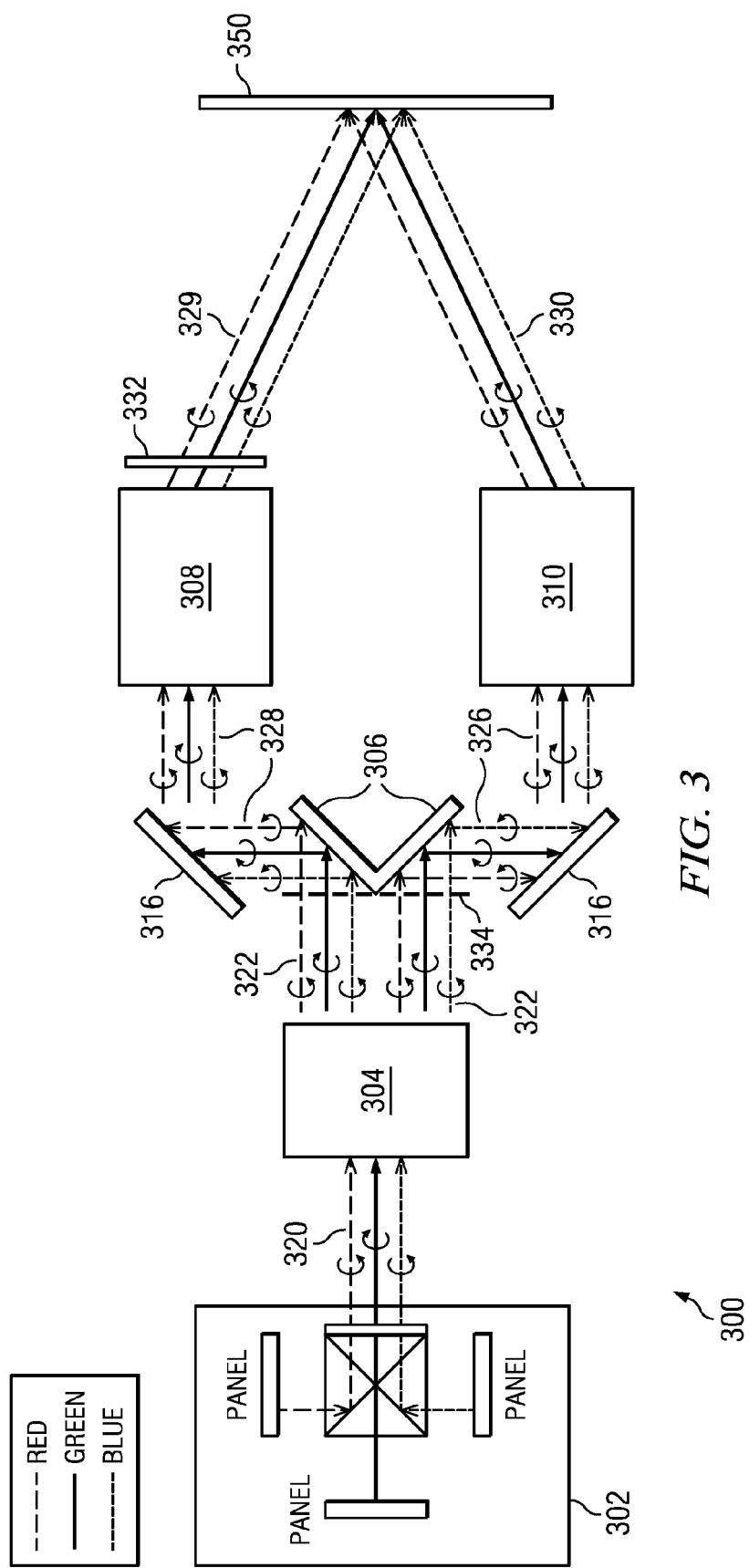
FIG. 3 is a schematic diagram of a stereoscopic projection system, in accordance with the present disclosure.

To address the above shortcomings of using a single LC projector, a separate frame dividing subsystem in conjunction with sophisticated polarization, electronic and optical management may be used. Accordingly, the stereoscopic frame dividing system embodiments disclosed herein generally include three parts: a relay subsystem that forms a real intermediate image; a light splitting subsystem that separates two areas of the real image; and a projection subsystem which creates overlapping screen images with opposite polarizations.

FIG. 1 is a schematic diagram of a stereoscopic projection system 100. In an embodiment, the system 100 includes a relay lens subsystem 106, light splitting subsystem 108, and projection subsystem 110.

In operation, the system 100 receives light at the relay lens subsystem 106 from a projection subsystem 120 at the input light path 104. The projection subsystem 120 may include, but is not limited to, an LC projection system or a DLP projection system. The light splitting subsystem 108 receives light from the relay lens subsystem 106 at the intermediate light path 107. The light splitting subsystem is operable to split the intermediate light path 107 into a first image light path 105 and a second image light path 109. The projection lens subsystem 110 receives light from the light splitting subsystem 108 at the first and second image light paths 105, 109 and outputs light to a screen 130.

In an embodiment, the projection lens subsystem 110 includes a first and second projection lens 111, 112. The first and second projection lens 111, 112 output a first and second output light path 115, 119 onto the screen 130.

In another embodiment (not shown), the projection lens subsystem 110 may include a single lens. In another embodiment (not shown), the projection lens subsystem 110 may include more than two lenses.

FIG. 2 is a block diagram of a stereoscopic projection system 200. The stereoscopic projection system 200 includes a relay lens subsystem 202, light splitting subsystem 204, and a projection lens subsystem 206. In an embodiment, the stereoscopic projection system 200 may also include an audio visual source 220, a controller subsystem 222, and a projection subsystem 224. The projection subsystem 224 may include, but is not limited to, an LC projection system or a DLP projection system.

In operation, the audio visual source 220 provides an audio visual signal 221 to the stereoscopic projection system 200. The controller subsystem 222 sends the signal to the projection subsystem 224. The projection subsystem 224 projects an image pair at the input light path 201. The relay lens subsystem 202 receives the input light path 201 and outputs an intermediate light path 203. The light splitting subsystem 204 receives the intermediate light path 203 and outputs a first image light path 205 and a second image light path 209. The projection lens subsystem 206 receives the first and second image light paths 205, 209.

In an embodiment, the projection lens subsystem 206 includes a first projection lens 207 and a second projection lens 208. The first projection lens 207 outputs a first output light path 215 onto a screen 230. The second projection lens outputs a second output light path 219 onto the screen 230.

In another embodiment, the projection lens subsystem 206 may include an image combining element (not shown) and a single projection lens (not shown). The image combining element (not shown) receives the first and second image light paths 205, 209 and the single projection lens (not shown) projects the combined image light paths onto the screen 230.

In another embodiment, the projection lens subsystem 206 includes more than two projection lenses and may include at least one image combining element.

In an embodiment, a controller subsystem 222 receives the audio visual signal 221 and outputs a control signal 223. The controller subsystem 222 is operable to sync with the projection subsystem 224, the relay lens subsystem 202, the light splitting subsystem 204, and the projection lens subsystem 206 via the control signal 223. Controller subsystem 222 is operable to send control signals and receive feedback signals from any one of the various subsystems to adjust their respective optical characteristics. The controller may take input from sensors, from the audio visual source 220, and/or from user input to make adjustments (e.g., to focus or calibrate the stereoscopic projection equipment on screen 230).

In another embodiment, the system 206 is a passive system and does not include active switching components. Thus, in this embodiment, the system 206 does not include a sync signal.

The relay lens subsystems (e.g., 106 in FIG. 1 or 202 in FIG. 2) disclosed herein are assumed to be polarization-preserving and are operable to work in parallel with the projection lens subsystem (e.g., 110 in FIG. 1 or 206 in FIG. 2) to provide approximately panel-sized intermediate images at a modest distance from the lens output. Although the relay lens subsystem is assumed to be a black box for all embodiments and its design is not specific to the disclosures herein, examples of relay systems may be found in commonly-assigned patent application Ser. No. 12/118,640, entitled "Polarization conversion system and method for stereoscopic projection," filed May 9, 2008, which is herein incorporated by reference. In a similar manner, the projection optics used to relay the intermediate images onto the screen are assumed conventional and specific designs are not provided since they are not germane to the disclosure. In some embodiments (e.g., in embodiments with a single projection lens), a polarization preserving projection lens may be used. An example of a polarization preserving projection lens is discussed by L. Sun et al. in *Low Birefringence Lens Design for Polarization Sensitive Systems*, Proc. SPIE Vol. 6288, herein incorporated by reference.

The polarization aspects of the disclosure generally include conditioning the light for efficient splitting and encoding of output images. Electronic aspects generally include pre-distorting the images to accommodate optical aberrations and allow anamorphic imaging techniques to preserve aspect ratio of the original panel when only half of the area is allocated to a full screen image. Generally, electronic alignment techniques may be used for on-screen image alignment. Optical aspects of the disclosure generally cover techniques of physically separating optical paths for each of the left and right eye images (e.g., the light splitting subsystem 108 in FIG. 1 or 204 in FIG. 2). In an embodiment, this splitting architecture is extended to enable superposition of the left and right eye images prior to projection.

In an embodiment, it is assumed that the projector provides circular polarized light with green light having the opposite handedness to red and blue. This is typical of three panel liquid crystal projectors that use a combining X-cube. The color dependent linear polarizations emanating from this element are routinely transformed into circular polarization to avoid back reflections from the projection lens which may affect ANSI contrast. The precise allocation of left handed or right handed polarization to the odd green wavelengths is arbitrary, but may be pre-conditioned correctly. It is assumed here that effective correction may use a crossed matching retarder, as this is the case for most commercial projectors on the market. Though geared toward the mixed circular output, the system embodiments should not be limited to the precise polarization states assumed to emanate from the projector.

The concepts covered here can be applied to alternative projectors (e.g., DLP, etc.) since the creation of equivalent entrance polarizations can be easily provided by available components. For instance, ColorSelect® technology may map between defined wavelength dependent polarization states, and are described in commonly-assigned U.S. Pat. No. 5,751,384, herein incorporated by reference.

FIG. 3 is a schematic diagram of a stereoscopic projection system 300. The stereoscopic projection system 300 may include a projector 302, a relay lens 304, an image splitting element 306, a first projection lens 308, and a second projection lens 310. In this exemplary embodiment, the system may 300 also include mirrors 316 for redirecting the first and second image light paths 328, 326 such that they are parallel with the relay lens 304 and projection lenses 308, 310.

In operation, the relay lens 304 receives light from the projector 302 at the input light path 320. The relay lens 304 outputs an intermediate light path 322 toward the image splitting element 306. The image splitting element 306 is operable to split the intermediate light path 322 into a first image light path 328 and a second image light path 326. The image splitting element 306 outputs the first and second image light paths 328, 326 toward the first and second projection lenses 308, 310. The first and second projection lenses 308, 310 receive the first and second image light paths 328, 326 and output first and second output light paths 329, 330 toward the screen 350. In this exemplary embodiment, a rotator 332 is positioned in the first output light path 329 between the first projection lens 308 and the screen 350. The rotator 332 may comprise an achromatic polarization rotator element (e.g., an achromatic half wave plate oriented at 45°). The achromatic polarization rotator element 332 is operable to rotate the polarization of the first output light path 329 such that the first and second output light paths 329, 330 have opposite polarization. The left and right eye images associated with the two beams are then projected and superimposed onto a polarization preserving screen using separate lenses.

In an embodiment, the input light path 320 relayed from the projector 302 may be circularly polarized image light. A circularly polarized intermediate image 334 relayed from the projector 302 may be optically split into two beams using a polarization preserving image splitting element 306 (e.g., highly reflective silver mirrors). The polarization of one beam is transformed using an achromatic polarization transformer 332, such as an achromatic half wave plate oriented at 45°, into its orthogonal state. The left and right eye images associated with the two beams are then projected (at the first and second output light paths 329, 330) and superimposed onto a polarization preserving screen 350 using separate projection lenses 308, 310.

The advantages of the projection system 300 include minimal polarization management and minimal special optical hardware. With this approach, an image's magenta and green color components emanate from different beams and projection lenses. As such, the projection system 300 may use careful image convergence, such as using manual or electronic manipulation of the underlying image to obtain adequate image convergence.

Using conventional optics, the projection system 300 may be inefficient. For example, the aspect ratios of the screen image to the separate left and right eye regions of the intermediate image may leave blank areas that nevertheless remain illuminated. This may be the case when the screen aspect closely matches the entire projection panel. To avoid this potential light loss, it may be better to distort the images on the projector's panels to fill the entire illuminated area and then to restore the required aspect ratio with anamorphic projection.

Figure 4A:
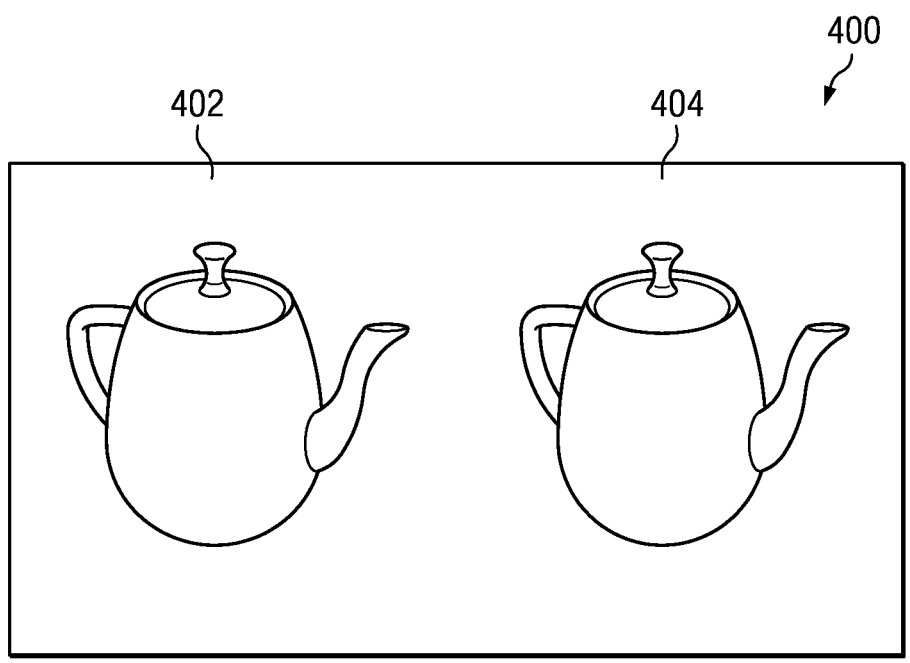
FIG. 4A is a schematic diagram of left/right side-by-side images, in accordance with the present disclosure.

FIG. 4A is a schematic diagram of an effective side-by-side distorted image 400 as efficiently displayed on LC panels. Side-by-side distorted image 400 includes left eye image 402 and right eye image 404. Though drawn side-by-side, it should be apparent to a person of ordinary skill in the art that this embodiment may also apply to over and under formats.

Figure 4B:
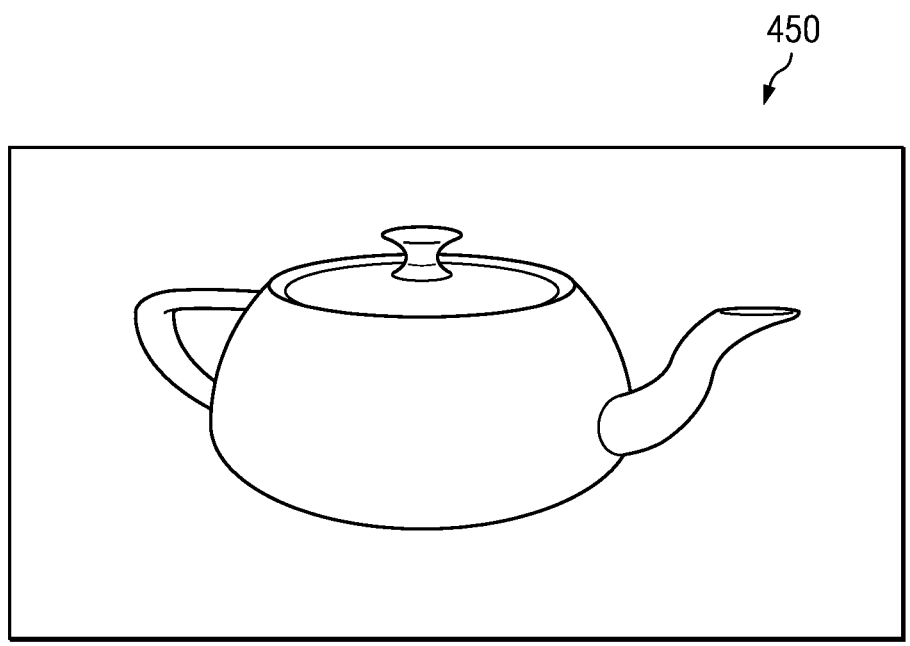
FIG. 4B is a schematic diagram of the left/right side-by-side images anamorphically superpositioned on a screen, in accordance with the present disclosure.

FIG. 4B is a schematic diagram of resulting superimposed images 450 achieved by parallel anamorphic projection of the left eye image 402 and the right eye image 404.

Referring back to FIG. 3, in an alternative embodiment, anamorphic imaging may be carried out in the relay lens 304 to provide an intermediate image 334 with correct aspect for each of the left or right eye images. In this case, distortion expected in the complex relay system may use electronic correction, or better, relative inversion of the paired images about the optical axis. Rotation of one of the images may then be done with the use of rotating separating prisms (not shown) as discussed in L. Lipton, Foundations of the Stereoscopic Cinema, Van Nostrand-Reinhold, Appendix 7, p. 260, 1982, herein incorporated by reference.

Anamorphic imaging may also be carried out in the projection lenses 308, 310 or using anamorphicafocal converter attachments after the projection lenses 308, 310.

Figure 5:
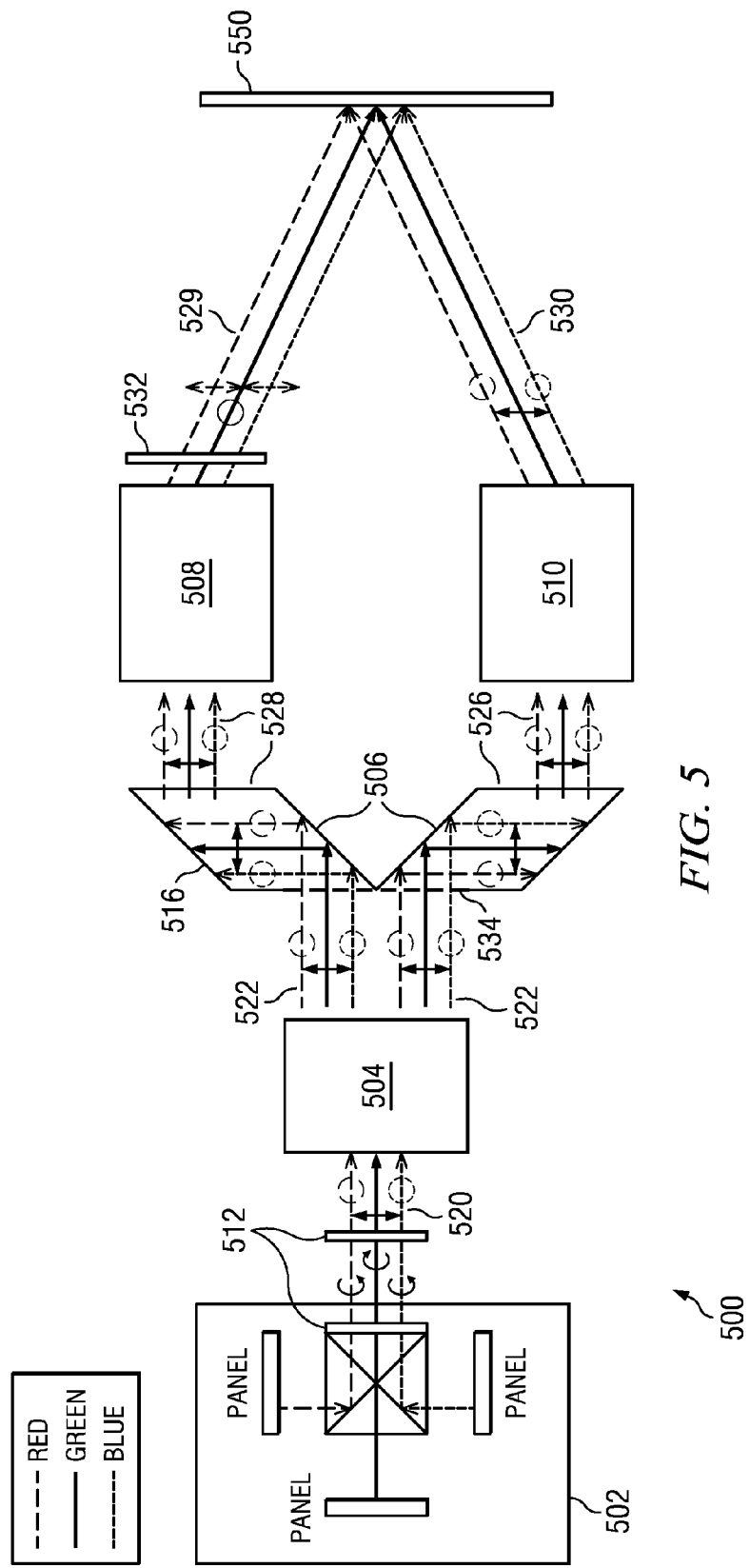
FIG. 5 is a schematic diagram of a stereoscopic projection system, in accordance with the present disclosure.

FIG. 5 is a schematic diagram of a stereoscopic projection system 500. The stereoscopic projection system 500 may include a projector 502, a relay lens 504, an image splitting element 506, a first projection lens 508, and a second projection lens 510.

In operation, the relay lens 504 receives light from the projector 502 at the input light path 520. The relay lens 504 outputs light on an intermediate light path 522 toward an intermediate image plane 534 at the input of the image splitting element 506. The image splitting element 506 is operable to split the light on the intermediate light path 522 into first image light path 528 and second image light path 526. In an embodiment, the image splitting element 506 may be total internal reflection (TIR) prisms 516. The TIR prisms 516 are operable to split the light on the intermediate light path 522 between a first and second image light path 528, 526 and to redirect the first and second image light paths 528, 526 such that they are parallel relative to the relay lens 504 and projection lenses 508, 510. The image splitting element 506 outputs light on the first and second image light paths 528, 526 toward the first and second projection lenses 508, 510. The first and second projection lenses 508, 510 receive the light on the first and second image light paths 528, 526 and output light on the first and second output light paths 529, 530 toward the screen 550. In an embodiment, a rotator 532 is positioned in the first output light path 529 between the first projection lens 508 and the screen 550. The rotator 532 may comprise an achromatic polarization rotator element (e.g., an achromatic half wave plate oriented at 45°). In operation, the achromatic polarization rotator element 532 is operable to rotate the polarization of the light on the first output light path 529 such that the light on the first and second output light paths 529, 530 have opposite polarization. The left and right eye images associated with the two beams are then projected and superimposed onto a polarization preserving screen using separate lenses.

In an embodiment, the stereoscopic projection system 500 may also include matched waveplates 512, arranged as shown, between the projector 502 and the relay lens 504. Alternatively, matched waveplates 512 may be positioned between the relay lens 504 and the image splitting element 506, near the intermediate image plane 534. As another alternative, a first matched waveplate 512 is positioned between the projector 502 and the relay lens 504 (as shown) and a second matched waveplate 512 is positioned between the relay lens 504 and the image splitting element 506, near the intermediate image plane 534. Linearly polarized light may be launched into the system for better preservation through the splitting elements. In an embodiment, the image splitting element 506 may include non-ideal separating mirrors. Here, the geometry may use polarization mixing, particularly if using a total internal reflection (TIR) prism 516 for redirecting circular polarized beams. In an embodiment, a TIR prism is preferred over mirrors for its higher reflectivity and smaller physical size. The imparted phase delay on reflection between s- and p-polarization components rapidly transform polarization into a propagation dependent state. This leads in general to projected image non-uniformity that can be corrected by introducing intensity and bit depth loss. To reduce these effects, linear polarization states may be created prior to entering the system. Polarization would be preserved to a great extent since these states would closely resemble the s- or p-Eigen-states for the majority of rays present in the imaging system.

Figure 6:
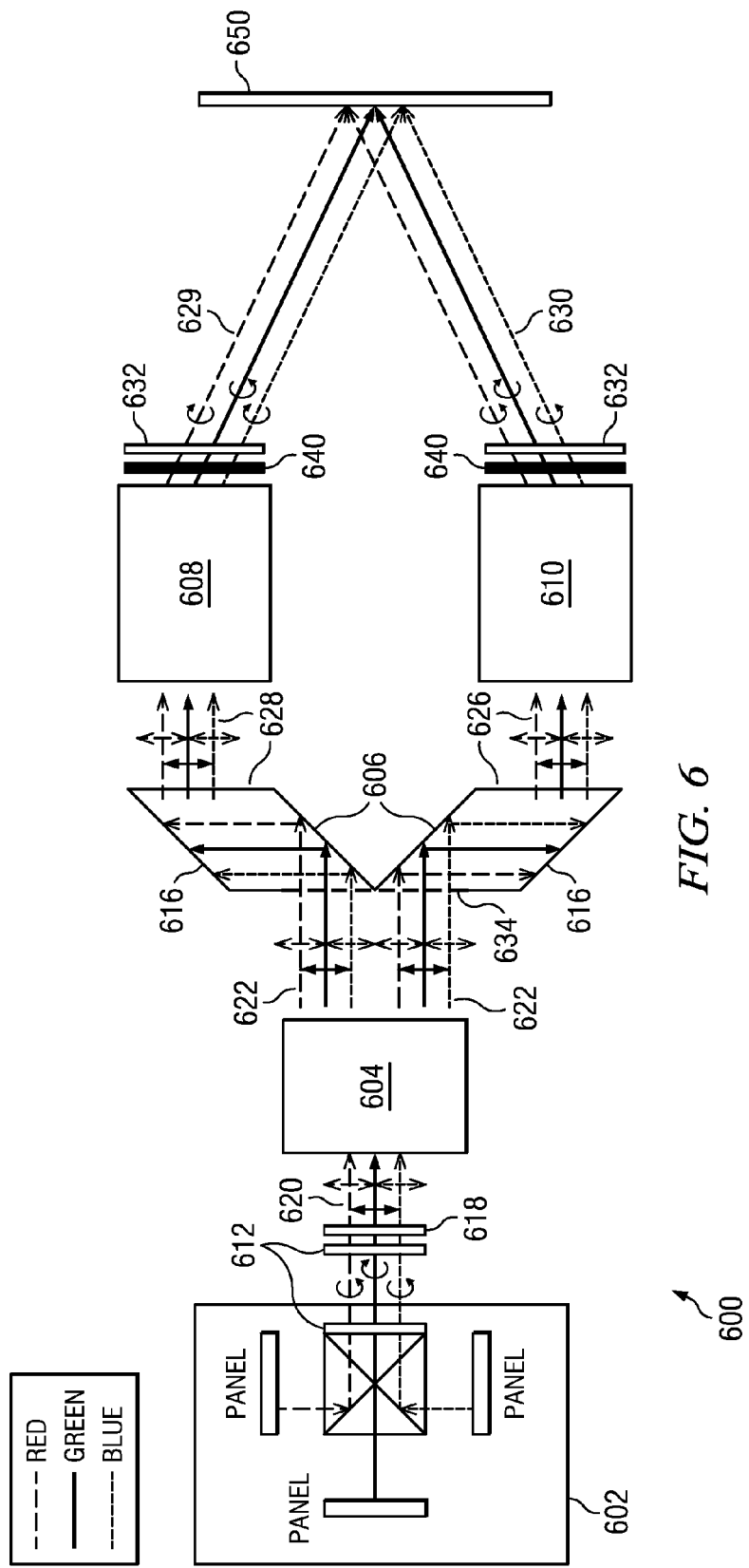
FIG. 6 is a schematic diagram of a stereoscopic projection system, in accordance with the present disclosure.

FIG. 6 is a schematic diagram of a stereoscopic projection system 600 using linear polarization states created prior to entering the system 600. The stereoscopic projection system 600 may include a projector 602, a relay lens 604, an image splitting element 606, a first projection lens 608, and a second projection lens 610.

In an embodiment, the stereoscopic projection system 600 may also include matched waveplates 612, wavelength-selective polarization filter 618 (e.g., a ColorSelect filter as taught in U.S. Pat. Nos. 5,751,384 and 5,953,083, herein incorporated by reference), linear polarizers 640, and/or 45° quarter wave plates 632.

In operation, the relay lens 604 receives light from the projector 602 at the input light path 620. In an embodiment, matched waveplates 612 and wavelength-selective polarization filter 618 are positioned on the input light path 620 between the projector 602 and the relay lens 604, arranged as shown. Alternatively, matched waveplates 612 may be positioned between the relay lens 604 and the image splitting element 606, near the intermediate image plane 634. As another alternative, a first matched waveplate 612 is positioned between the projector 602 and the relay lens 604 (as shown) and a second matched waveplate 612 is positioned between the relay lens 604 and the image splitting element 606, near the intermediate image plane 634. The relay lens 604 outputs an intermediate light path 622 toward an intermediate image plane 634 at the input of the image splitting element 606. The image splitting element 606 is operable to split the intermediate light path 622 into a first image light path 628 and a second image light path 626. In an embodiment, the image splitting element 606 may be total internal reflection (TIR) prisms 616. The TIR prisms 616 are operable to split the intermediate light path 622 into a first and second image light path 628, 626 and to redirect the first and second image light paths 628, 626 such that they are parallel relative to the relay lens 604 and projection lenses 608, 610. The image splitting element 606 outputs the first and second image light paths 628, 626 toward the first and second projection lenses 608, 610. The first and second projection lenses 608, 610 receive the first and second image light paths 628, 626 and output first and second output light paths 629, 630 toward the screen 650. In this exemplary embodiment, linear polarizers 640 are positioned in at least one of the first and second image light paths 628, 626 between the first and second projection lenses 608, 610 and the screen 650; and 45° quarter wave plates 632 are positioned in at least one of the first and second image light paths 628, 626 between the first and second projection lenses 608, 610 and the screen 650.

As discussed above, the stereoscopic projection system 600 may include wavelength-selective polarization filters 618 (e.g., ColorSelect polarization filters) to create a linearly polarized input beam 620, which is preserved throughout the system, and which is cleaned up and circularly encoded at the system exit 629, 630 for good polarization fidelity. To be compatible with the head tilt tolerant circular polarization of incumbent systems, orthogonally oriented quarter-wave plates 632 may be introduced at the output of the projection lenses 608, 610 with the achromatic rotator element removed. Anamorphic imaging techniques may also be introduced for efficiency as described above.

Polarization integrity, which is desired for low cross-talk stereoscopic systems, relies on the polarization preservation of substantially the entire optical system. While this might be sufficient for some systems, a clean-up step is preferred for high end performance. In an embodiment, neutral linear polarizers 640 may be introduced into the first and second output light paths 629, 630 to clean up the polarization. The stereoscopic projection system 600 selectively transforms the green polarization into that of the red and blue (thus, the optical beams have substantially uniform polarization) using wavelength-selective polarization filters 618. An additional advantage of creating uniformly polarized white beams is that the final projected images for the left and right eyes do not use internal alignment via lens shift. In other words, the left and right eye images will have their color components aligned independently of the lens alignment. Only the much less sensitive relative alignments would be determined by mechanical or electronic manipulations. In an embodiment, the preferred position for a green-transforming filter would be earlier rather than later in the system 600 such that color components of either right- or left-eye images follow the same path through the optical system. Equivalent paths may avoid unwanted color-dependent distortions in any one image.

Figure 7:
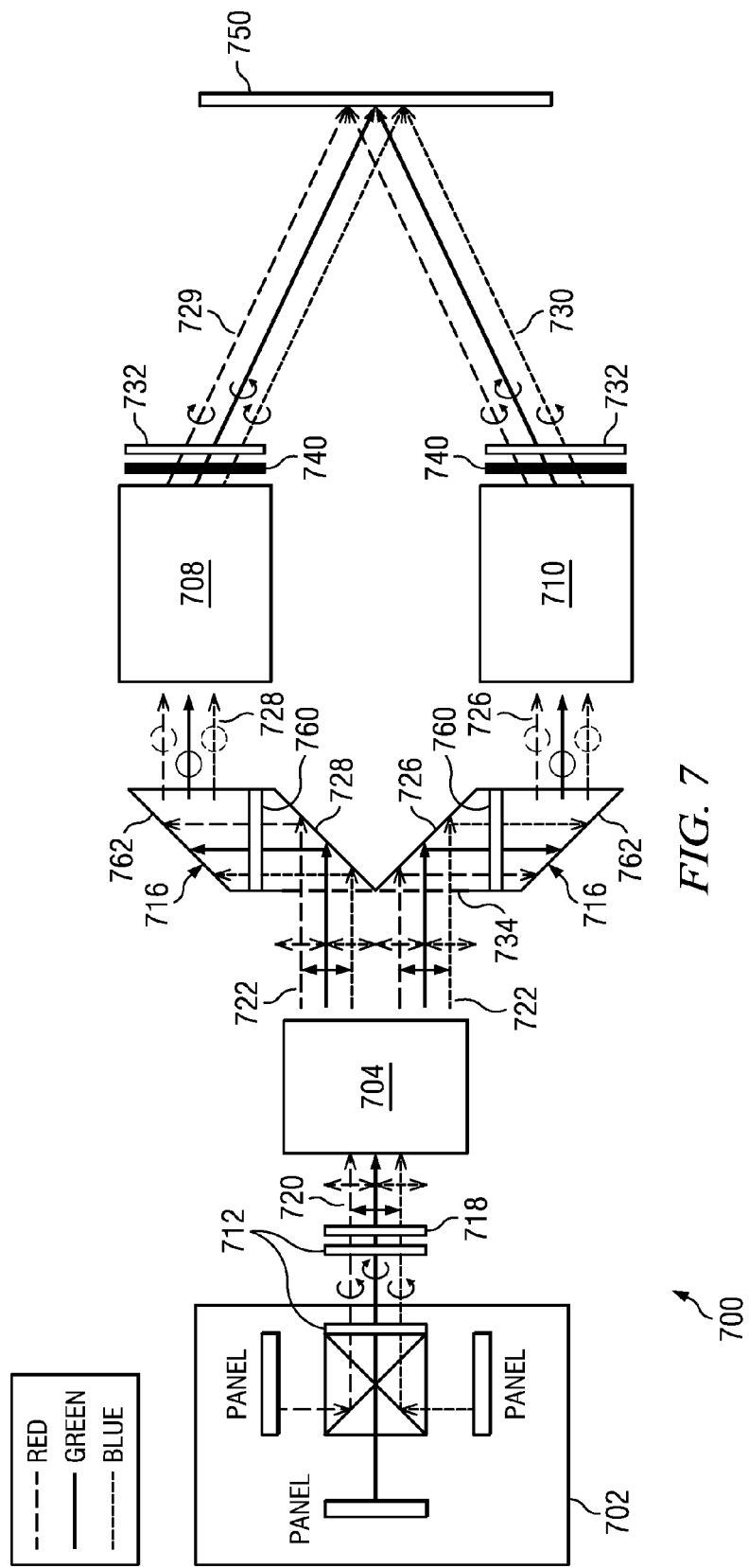
FIG. 7 is a schematic diagram of a stereoscopic projection system, in accordance with the present disclosure.

FIG. 7 is a schematic diagram of a stereoscopic projection system 700 incorporating polarization transforming components within TIR prisms. The stereoscopic projection system 700 may include a projector 702, a relay lens 704, an image splitting element 706, a first projection lens 708, and a second projection lens 710.

In this exemplary embodiment, the stereoscopic projection system 700 may also include matched waveplates 712, a wavelength-selective polarization filter 718, polarization transformers 760, prisms 716, linear polarizers 740, and/or 45° quarter wave plates 732.

In operation, the relay lens 704 receives light from the projector 702 at the input light path 720. Matched waveplates 712 and wavelength-selective polarization filter 718 may be positioned on the input light path 720 between the projector 702 and the relay lens 704. Alternatively, matched waveplates 712 may be positioned between the relay lens 704 and the image splitting element 706, near the intermediate image plane 734. As another alternative, a first matched waveplate 712 is positioned between the projector 702 and the relay lens 704 (as shown) and a second matched waveplate 712 is positioned between the relay lens 704 and the image splitting element 706, near the intermediate image plane 734. The relay lens 704 outputs an intermediate light path 722 toward an intermediate image plane 734 at the input of the image splitting element 706. The image splitting element 706 is operable to split the intermediate light path 722 into a first image light path 728 and a second image light path 726. In this exemplary embodiment, the image splitting element 706 may be prisms 716. The prisms 716 are operable to split the intermediate light path 722 into a first image light path 728 and a second image light path 726 and to redirect the first and second image light paths 728, 726 such that they are parallel relative to the relay lens 704 and projection lenses 708, 710. In another embodiment, the prisms 716 may further include polarization transformers 760. The polarization transformers 760 are operable to transform the state of polarization (e.g., from p-polarization to s-polarization eigen states). The image splitting element 706 outputs the first and second image light paths 728, 726 toward the first and second projection lenses 708, 710. The first and second projection lenses 708, 710 receive the first and second image light paths 728, 726 and output first and second output light paths 729, 730 toward the screen 750. In an embodiment, linear polarizers 740 are positioned in at least one of the first and second image light paths 728, 726 between the first and second projection lenses 708, 710 and the screen 750; and 45° quarter wave plates 732 are positioned in at least one of the first and second image light paths 728, 726 between the first and second projection lenses 708, 710 and the screen 750.

The system 700 discussed above incorporates polarization compensating and polarization transforming components 760 within the Total Internal Reflection (TIR) prisms 716 resulting in improved polarization conservation within the TIR prisms. Even with linear polarization, TIR reflection may preserve polarization for rays in the plane of the diagram of FIG. 6. For all rays out of this plane, the s- and p-polarization axes are rotated geometrically with respect to the input polarization orientation. The significant phase difference on total internal reflection (TIR) may cause ellipticity. In this embodiment, where the two reflecting surfaces of a single prism 716 are substantially parallel, the orientation of the s- and p-polarization axes are substantially equivalent and the net phase difference is twice that imparted by the first reflection. This precise geometrical alignment of the s- and p-axes for all ray directions enables correction of this depolarization through axis swapping. It is possible to swap the s- and p-polarization components without affecting their relative phase by introducing a special polarization transformation element 760 in the optical path between the two reflections (i.e. inside the prism 716). Reflecting off the second TIR surface 762 then introduces the opposite phase difference between s- and p-returning linear polarization for substantially all rays. In an embodiment, the transforming component 760 is made of a stack of retarders that create a 90° polarization transformation independent of the component's orientation and is described in detail in Robinson et al., Polarization Engineering for LCD Projection, Ch. 6, Wiley & Sons, 2004, herein incorporated by reference.

Figure 8:
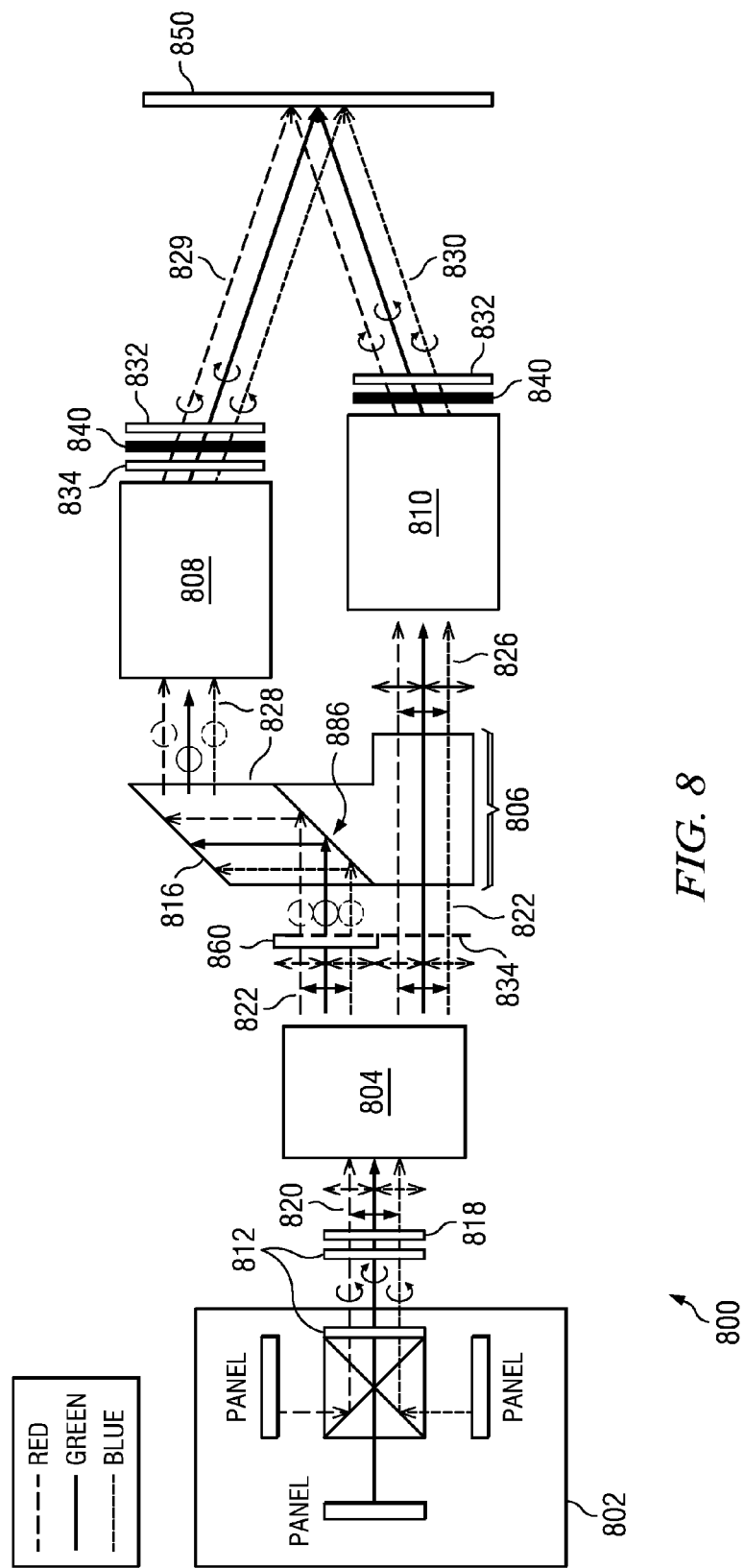
FIG. 8 is a schematic diagram of a stereoscopic projection system, in accordance with the present disclosure.

FIG. 8 is a schematic diagram of a stereoscopic projection system 800 incorporating spatial polarization manipulations and polarization beam splitting. The stereoscopic projection system 800 may include a projector 802, a relay lens 804, an image splitting element 806, a first projection lens 808, and a second projection lens 810.

In an embodiment, the stereoscopic projection system 800 may also include matched waveplates 812, a wavelength-selective polarization filter 818, polarization transformer 860, linear polarizers 840, an achromatic rotator 834, and/or 45° quarter wave plates 832.

In operation, the relay lens 804 receives light from the projector 802 at the input light path 820. In an embodiment, matched waveplates 812 and wavelength-selective polarization filter 818 are positioned on the input light path 820 between the projector 802 and the relay lens 804. Alternatively, matched waveplates 812 may be positioned between the relay lens 804 and the image splitting element 806, near the intermediate image plane 834. As another alternative, a first matched waveplate 812 is positioned between the projector 802 and the relay lens 804 (as shown) and a second matched waveplate 812 is positioned between the relay lens 804 and the image splitting element 806, near the intermediate image plane 834. The relay lens 804 outputs an intermediate light path 822 toward an intermediate image plane 834 at the input of the image splitting element 806. The image splitting element 806 is operable to split the intermediate light path 822 into a first image light path 828 and a second image light path 826. In an embodiment, the image splitting element 806 includes a polarization beam splitter 886. The polarization beam splitter (PBS) 886 is positioned in part of the intermediate light path 822. As a result, part of the intermediate light path 822 passes by the PBS 886 toward the second projection lens 810 (becoming the second image light path 826 with little or no optical transformation) and the other part of the intermediate light path 822 that passes through the PBS 886, is reflected at reflector 816, and output towards the first projection lens 808 (becoming the first image light path 828). Reflector 816 may be a mirror, PBS, a TIR prism surface, or any other suitable reflective element.

In an embodiment, the system 800 further includes a polarization transformer 860 positioned on the part of the intermediate light path 822 between the relay lens 804 and the PBS 886. The image splitting element 806 outputs the first and second image light paths 828, 826 toward the first and second projection lenses 808, 810. The first and second projection lenses 808, 810 receive the first and second image light paths 828, 826 and output first and second output light paths 829, 830 toward the screen 850. In an embodiment, linear polarizers 840 are positioned in at least one of the first and second image light paths 828, 826 between the first and second projection lenses 808, 810 and the screen 850; and 45° quarter wave plates 832 are positioned in at least one of the first and second image light paths 828, 826 between the first and second projection lenses 808, 810 and the screen 850. An achromatic rotator 834 may be positioned in at least one of the first and second image light paths 828, 826 between the first and second projection lenses 808, 810 and the screen 850.

In this exemplary embodiment, polarization integrity is preserved by using the PBS 886 in place of the reflecting splitting elements (e.g., the reflecting splitting elements shown in FIGS. 3, 5, 6, and 7). By splitting the beams in this manner, a single pair of reflecting surfaces is used. In its simplest form, this imparts a path difference between the channels as shown in FIG. 8. Introducing extra glass between the intermediate image 834 and the bottom projection lens 810 may match the optical path to the lenses. The resultant difference in the path lengths to the screen 850 may be tolerated in cinema systems where the throw is large. De-magnifying correction optics may be used in shorter throw situations or, alternatively, electronic correction may be used at the panel. In an embodiment, the quarter wave plates 832 may be removed and the system 800 is thereby transformed into one that delivers linearly polarized projected light. Another adaptation to this exemplary embodiment is to introduce an additional PBS interface at the reflective surface 816 where the TIR reflection occurs. Having two PBS reflections in series may reduce the level of unwanted p-polarization leakage enough that lossy clean-up polarizers at the lens' exits are not used.

Figure 9:
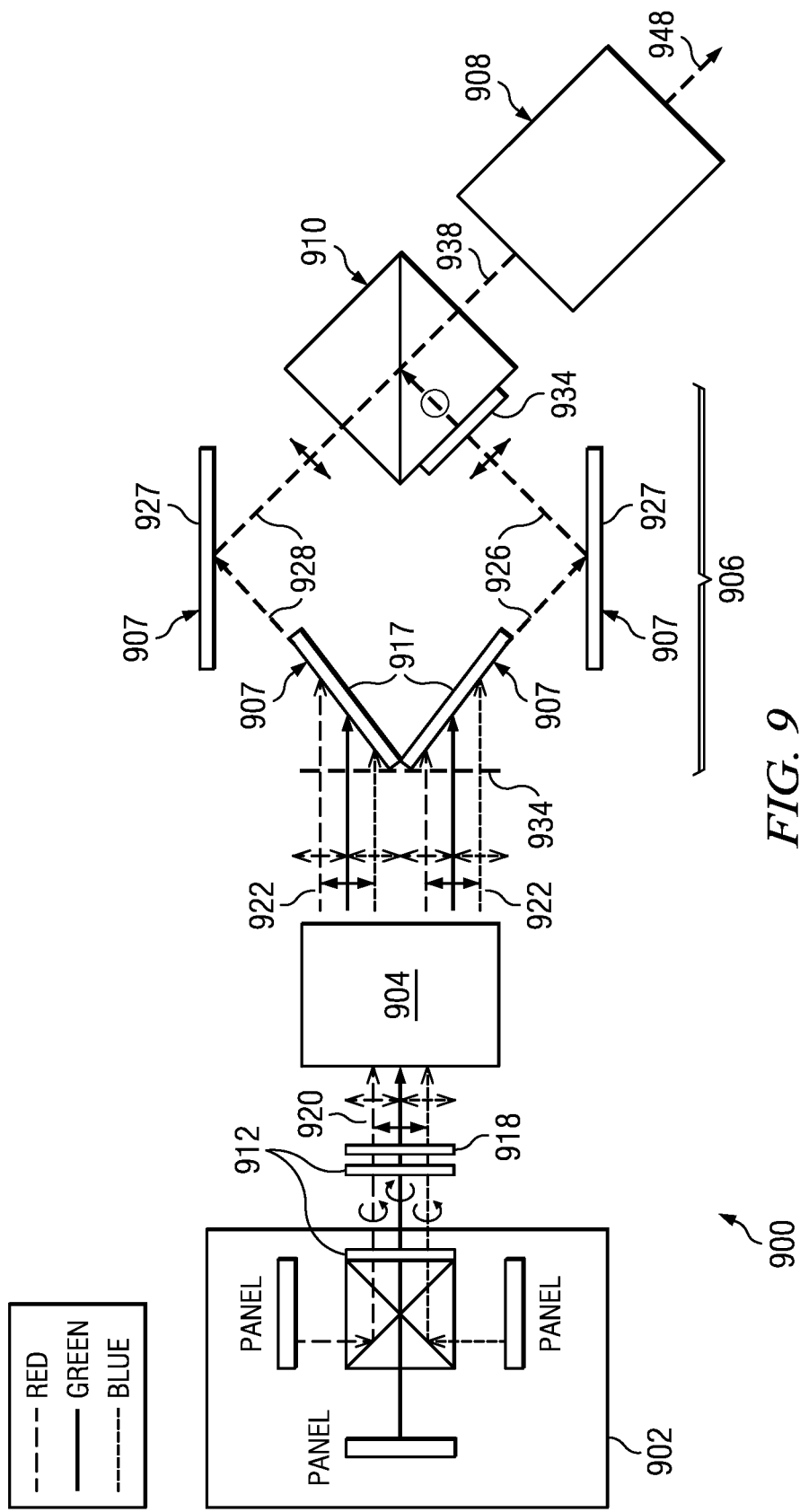
FIG. 9 is a schematic diagram of a stereoscopic projection system, in accordance with the present disclosure.

FIG. 9 is a schematic diagram of a stereoscopic projection system 900. The system 900 may include a projection element 902, a relay lens 904, an image splitting element 906, an image combining element 910 and a projection lens 908.

In operation, the relay lens 904 receives light from the projector 902 at the input light path 920. In an embodiment, matched waveplates 912 and wavelength-selective polarization filter 918 are positioned on the input light path 920 between the projector 902 and the relay lens 904. Alternatively, matched waveplates 912 may be positioned between the relay lens 904 and the image splitting element 906, near the intermediate image plane 934. As another alternative, a first matched waveplate 912 is positioned between the projector 902 and the relay lens 904 (as shown) and a second matched waveplate 912 is positioned between the relay lens 904 and the image splitting element 906, near the intermediate image plane 934. The relay lens 904 outputs an intermediate light path 922 toward an intermediate image plane 934 at the input of the image splitting element 906. The image splitting element 906 is operable to split the intermediate light path 922 into a first image light path 928 and a second image light path 926. In an embodiment, the image splitting element 906 includes mirrors 907. The initial set of mirrors 917 (i.e., the two mirrors 907 receiving the intermediate light path 922) split the intermediate light path 922 into the first and second image light paths 928, 926. The second set of mirrors 927 (i.e., the two mirrors 907 receiving the first and second image light paths 928, 926 from the initial set of mirrors 917) then reflect the first and second image light paths 928, 926 toward an image combining element 910. In an embodiment, the image combining element includes a polarizing beam splitter. An achromatic rotator may be positioned in one or both of the first and second image light paths 928, 926 between one or both of the second set of mirrors 927 and the PBS 910. The PBS 910 is operable to combine the first and second image light paths 928, 926 into a third image light path 938. The projection lens 908 receives the third image light path 938 and projects an output image light path 948 toward a screen (not shown).

In an embodiment, the system 900 includes superposition of oppositely polarized left- and right-eye image paths (e.g., first and second image light paths 928, 926) carried out at the interface of a PBS 910 before being projected by a single lens 908. By encoding the two images with orthogonal polarizations and directing them symmetrically into a polarizing beam splitting element 910 the two images appear to emanate from the same plane. A single polarization preserving projection lens 908 can then project the images onto a screen.

The projected beam 948 exits at 45° to the original projection direction. Extra folding mirrors and/or prisms may be introduced to avoid this but have been omitted from the diagram for better clarity. Also the polarization rotator element 934 may introduce an optical path mismatch which may in practice be matched with dummy material at the top entrance to the PBS 910. Slight modifications to this embodiment could include using TIR reflecting glass prisms in place of mirrors for efficiency and size reasons. Also anamorphic imaging with suitable correction is assumed for efficiency purposes. This includes using a Bravais system in conjunction with the relay lens, or an anamorphic afocal converter following the projection lens.

The advantages of this system concerns internal alignment of the images, which minimizes external lens manipulations. System size, cost and complexity of operation are also significant advantages.

Bravais Systems

Bravais optical systems have been utilized to provide anamorphic stretch or compression along one direction of an image as disclosed by W. Smith in *Modern Optical Engineering*, p. 272, McGraw-Hill 1990 (describing the use of Bravais optics in motion pictures work), which is herein incorporated by reference for all purposes. Generally, Bravais systems comprise a positive and negative cylindrical element separated by a finite distance and located in the finite conjugate of a lens system.

A Bravais system may be inserted near the panel, close to the relay lens output, or close to the projection lens input. The polarization and color management optics may in some cases make inserting Bravais optics near the panel difficult. A Bravais system implemented close to the projection lens input may also be difficult. The Bravais system shortens the projection lens back focal length (BFL), and a long BFL is preferred for inserting the PBS, splitting prism, and mirrors.

Figure 10:
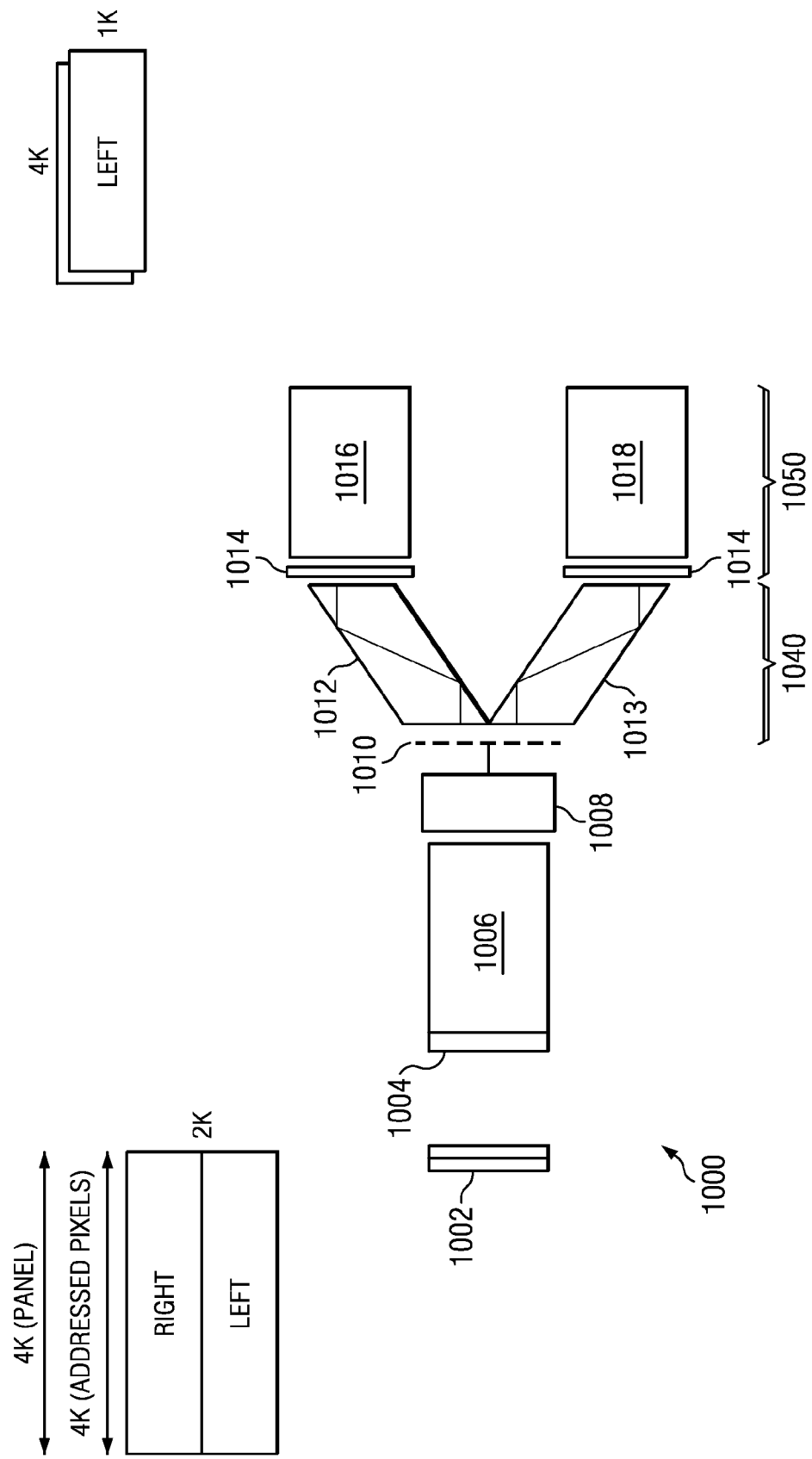
FIG. 10 is a schematic diagram of a stereoscopic projection system, in accordance with the present disclosure.

FIG. 10 is a schematic diagram of a stereoscopic projection system 1000 incorporating Bravais optics 1008. The system 1000 includes a panel 1002 (or is positioned after a panel 1002); a relay lens 1006; an image splitting subsection 1040; and a projection lens subsystem 1050. The system 1000 may also include a quarter wave plate 1004 positioned adjacent to the relay lens 1006 and/or quarter wave plates 1014 positioned adjacent to at least one projection lens 1016, 1018 in the projection lens subsystem 1050.

In operation, the relay lens 1006 receives light from a panel 1002. The relay lens 1006 outputs that light to the Bravais optics 1008. The Bravais optics 1008 output the light to an intermediate image plane 1010. In an embodiment, at the intermediate image plane 1010, the light input by the panel 1002 has been magnified 2× vertically and 1× horizontally by the Bravais optics 1008. Next, the intermediate image light is split by the image splitting subsystem 1040. In an embodiment, the image splitting subsystem 1040 includes two prisms 1012, 1013 for splitting the intermediate image light. The two prisms 1012, 1013 output the light to the projection lens subsystem 1050. In an embodiment, the projection lens subsystem 1050 includes two projection lenses 1016, 1018. Each projection lens 1016, 1018 receives light from one of the prisms 1012, 1013 and each projection lens 1016, 1018 outputs a separate image. In another embodiment, the projection lens subsystem 1050 includes an image combining element (not shown) and only contains a single projection lens. The image combining element combines the light received from the prisms 1012, 1013 into one light beam and the single projection lens projects the light.

In an embodiment, a quarter wave plate 1004 may be positioned between the panel 1002 and relay lens 1006. In another embodiment, a quarter wave plate 1014 may be positioned between at least one prism 1012, 1013 and a projection lens 1016, 1018.

The Bravais 1008 may be placed after the relay lens 1006 and before the splitting prisms 1012, 1013. In this exemplary embodiment, the Bravais 1008 magnifies the intermediate image by 2× in the vertical direction and 1× in the horizontal direction, allowing the full panel size to be utilized in 3D mode. In an embodiment, the Bravais 1008 is removed, and the splitting prisms 1012, 1013 and projection lenses 1016, 1018 are translated vertically such that the entire intermediate image passes through a single TIR prism and single projection lens, the full resolution image from the panel can be utilized for 2D presentations.

External Anamorphic Afocal Converters

Figure 11:
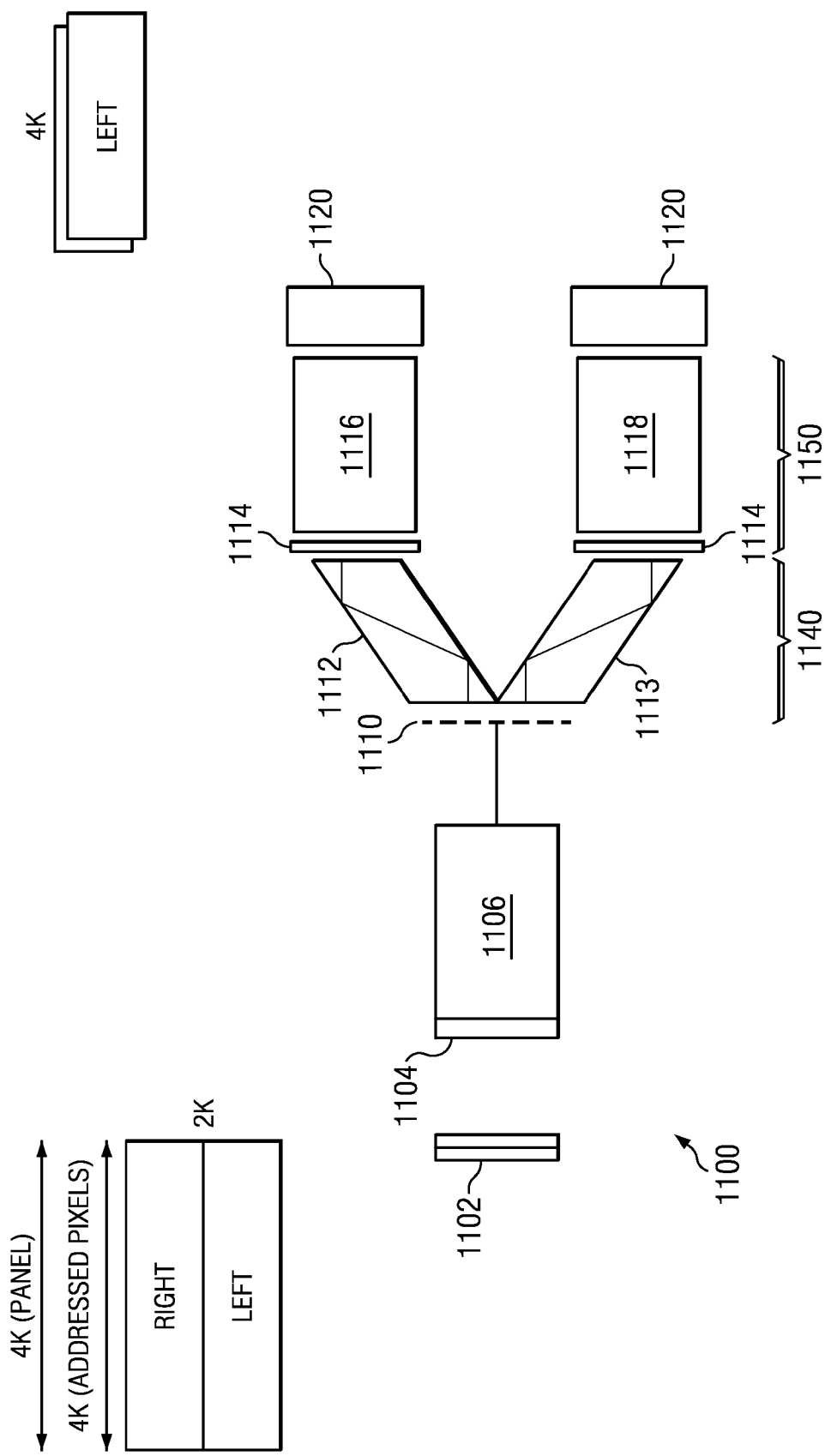
FIG. 11 is a schematic diagram of a stereoscopic projection system, in accordance with the present disclosure.

FIG. 11 is a schematic diagram of a stereoscopic projection system 1100. The system 1100 may include a panel 1102 (or is positioned after a panel 1102); a relay lens 1106; an image splitting subsection 1140; and a projection lens subsystem 1150. The system 1100 may also include a quarter wave plate 1104 positioned adjacent to the relay lens 1106 and/or quarter wave plates 1114 positioned adjacent to at least one projection lens 1116, 1118 in the projection lens subsystem 1150. In an embodiment, the projection lens subsystem includes an anamorphic afocal converter 1120.

In operation, the relay lens 1106 receives light from a panel 1102. The relay lens 1106 outputs that light to an intermediate image plane 1110. The intermediate image light is split by the image splitting subsystem 1140. In an embodiment, the image splitting subsystem 1140 may include two prisms 1112, 1113 for splitting the intermediate image light. The two prisms 1112, 1113 output the light to the projection lens subsystem 1150. In an embodiment, the projection lens subsystem 1150 includes two projection lenses 1116, 1118. Each projection lens 1116, 1118 receives light from one of the prisms 1112, 1113 and each projection lens 1116, 1118 outputs a separate image. In an embodiment, an anamorphic afocal converter 1120 is positioned after each projection lens 1116, 1118. In an embodiment, a quarter wave plate 1104 may be positioned between the panel 1102 and relay lens 1106. In another embodiment, a quarter wave plate 1114 may be positioned between at least one prism 1112, 1113 and a projection lens 1116, 1118.

The external anamorphic afocal converters 1120 may improve the lumen output of the system. As shown in FIG. 11, the converters 1120 can be located after the projection lenses 1116, 1118. Alternatively, the projection lenses 1116, 1118 themselves may be made anamorphic (e.g., as a single projection lens is made anamorphic in U.S. Pat. No. 5,930,050, herein incorporated by reference) to improve the lumen output.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A stereoscopic projection system, comprising:
   a relay lens subsystem operable to receive a stereoscopic image frame from a projection subsystem along an input light path and convey the stereoscopic image frame to an intermediate image plane, the stereoscopic image frame having first image area light and second image area light;
   a light splitting subsystem operable to receive the stereoscopic image frame at the intermediate image plane and split the first and second image area light, to direct the first image area light on a first image light path, and to direct the second image area light on a second image light path; and
   a projection lens subsystem operable to direct the first and second image area light toward a screen.

2. The stereoscopic projection system of claim 1 wherein the projection lens subsystem comprises a first and a second lens;
   wherein the first lens is operable to focus the first image area light on a first output image path toward a screen;
   wherein the second lens is operable to focus the second image area light on a second output image path toward the screen; and
   wherein the first and second image area light substantially overlap on the screen.

3. The stereoscopic projection system of claim 1, further comprising a liquid crystal (LC) projector.

4. The stereoscopic projection system of claim 3, further comprising a matched waveplate located on the input light path before the relay lens subsystem, the matched waveplate being substantially dispersion matched to a waveplate within the LC projector.

5. The stereoscopic projection system of claim 3, further comprising a matched waveplate located on an intermediate light path after the relay lens subsystem, the matched waveplate being substantially dispersion matched to a waveplate within the LC projector.

6. The stereoscopic projection system of claim 1, further comprising:
   a wavelength selective polarization filter located on one of the input light path and intermediate light path;
   a first linear polarizer and a first quarter wave plate located on a first output light path; and
   a second linear polarizer and a second quarter wave plate located on a second output light path,
   wherein the first quarter wave plate is oriented at +45 degrees to the first linear polarizer, wherein the second quarter wave plate is oriented at −45 degrees to the second linear polarizer such that the first and second quarter wave plates are orthogonal.

7. The stereoscopic projection system of claim 1, further comprising an achromatic rotator located on one of a first and a second output light paths.

8. The stereoscopic projection system of claim 1, wherein the light splitting subsystem comprises a first and a second pair of mirrors.

9. The stereoscopic projection system of claim 1, wherein the light splitting subsystem comprises a first and a second total internal reflection prism.

10. The stereoscopic projection system of claim 9, wherein the light splitting subsystem further comprises a first and a second polarization transformer.

11. The stereoscopic projection system of claim 1, wherein the light splitting subsystem comprises a polarization transformer and a polarization beam splitter (PBS),
   wherein the polarization transformer is operable to transform the polarization state of first image area light at the intermediate image plane prior to entering the PBS,
   wherein the polarization state of the second image area light is not transformed.

12. The stereoscopic projection system of claim 1, wherein the first area image light and the second area image light comprise one of a video game stereoscopic image and a motion picture stereoscopic image.

13. The stereoscopic projection system of claim 1, wherein the projection lens subsystem comprises a polarization beam splitter (PBS) and a single projection lens;
   wherein the PBS is operable to combine the first and second image area light;
   wherein the single projection lens is operable to project the combined first and second image area light toward the screen; and
   wherein the first and second image area light substantially overlap on the screen.

14. The stereoscopic projection system of claim 2, further comprising an achromatic rotator located on one of the first and the second output light paths, wherein the light splitting subsystem comprises a first and a second pair of mirrors.

15. The stereoscopic projection system of claim 2, further comprising:
   an achromatic rotator located on one of the first and the second output light paths; and
   a matched waveplate located on one of the input light path and an intermediate light path;
   wherein the light splitting subsystem comprises a first and a second total internal reflection prism.

16. The stereoscopic projection system of claim 2, further comprising:
   a matched waveplate located on one of the input light path and an intermediate light path;
   a wavelength selective polarization filter located on one of the input light path and the intermediate light path;
   a first linear polarizer and a first quarter wave plate located on the first output light path; and
   a second linear polarizer and a second quarter wave plate located on the second output light path,
   wherein the first quarter wave plate is oriented at +45 degrees to the first linear polarizer, wherein the second quarter wave plate is oriented at −45 degrees to the second linear polarizer such that the first and second quarter wave plates are orthogonal.

17. A method of stereoscopic projection, comprising:
   optically receiving a stereoscopic image frame from a projector, the stereoscopic image frame having first image area light and second image area light;
   splitting the first image area light from the second image area light;
   directing the first image area light on a first light path;
   directing the second image area light on a second light path; and
   focusing the first and second light path light toward a screen, wherein the first image area light substantially overlaps with the second image area light.

18. The method of claim 17, wherein the first image area comprises a left eye image and the second image area comprises a right eye image.

19. The method of claim 17, wherein the left eye image and the right eye image comprises a motion picture stereoscopic image;
   wherein the stereoscopic image frame comprises polarized light; and
   wherein the projector is a liquid crystal projector.

20. A stereoscopic projection system, comprising:
   a relay lens subsystem operable to receive a stereoscopic image frame from a projection subsystem along an input light path and convey the stereoscopic image frame to an intermediate image plane, the stereoscopic image frame having first image area light and second image area light;
   a light splitting subsystem operable to receive the stereoscopic image frame at the intermediate image plane and split the first and second image area light, to direct the first image area light on a first image light path, and to direct the second image area light on a second image light path;
   a first lens operable to direct the first image area light on a first output image path toward a screen; and
   a second lens operable to direct the second image area light on a second output image path toward the screen.

21. The stereoscopic projection system of claim 20, further comprising:
   a first anamorphic afocal converter located on the first output image path, and
   a second anamorphic afocal converter located on the second output image path.

22. The stereoscopic projection system of claim 21, further comprising a matched waveplate located on the input light path before the relay lens subsystem, the matched waveplate being substantially dispersion matched to a waveplate within a projector.

23. The stereoscopic projection system of claim 21, further comprising a matched waveplate located on an intermediate light path after the relay lens subsystem, the matched waveplate being substantially dispersion matched to a waveplate within a projector.

24. The stereoscopic projection system of claim 21, further comprising:
   a first quarter wave plate positioned adjacent to the first lens; and
   a second quarter wave plate positioned adjacent to the second lens.

25. A stereoscopic projection system, comprising:
   a relay lens subsystem operable to receive a stereoscopic image frame from an input light path and convey the stereoscopic image frame to an intermediate image plane, the stereoscopic image frame having first image area light and second image area light;
   a wavelength selective polarization filter located on one of the input light path and intermediate light path;
   a light splitting subsystem operable to receive the stereoscopic image frame at the intermediate image plane and split the first and second image area light, to direct the first image area light on a first image light path, and to direct the second image area light on a second image light path;
   a projection lens subsystem operable to direct the first and second image area light toward a screen;
   a first linear polarizer and a first quarter wave plate located on a first output light path; and
   a second linear polarizer and a second quarter wave plate located on a second output light path,
   wherein the first quarter wave plate is oriented at +45 degrees to the first linear polarizer and wherein the second quarter wave plate is oriented at −45 degrees to the second linear polarizer such that the first and second quarter wave plates are orthogonal.

26. A stereoscopic projection system, comprising:
   a relay lens subsystem operable to receive a stereoscopic image frame from an input light path and convey the stereoscopic image frame to an intermediate image plane, the stereoscopic image frame having first image area light and second image area light;
   a matched waveplate located on one of the input light path and an intermediate light path;

a wavelength selective polarization filter located on one of the input light path and the intermediate light path;

a light splitting subsystem operable to receive the stereoscopic image frame at the intermediate image plane and split the first and second image area light, to direct the first image area light on a first image light path, and to direct the second image area light on a second image light path;

a projection lens subsystem operable to direct the first and second image area light along a first output light path and a second output image path, respectively, toward a screen;

a first linear polarizer and a first quarter wave plate located on the first output light path; and a second linear polarizer and a second quarter wave plate located on the second output light path, wherein the projection lens subsystem comprises a first and a second lens;

wherein the first lens is operable to focus the first image area light on the first output image path toward the screen;

wherein the second lens is operable to focus the second image area light on the second output image path toward the screen;

wherein the first and second image area light substantially overlap on the screen; and wherein the first quarter wave plate is oriented at +45 degrees to the first linear polarizer and wherein the second quarter wave plate is oriented at −45 degrees to the second linear polarizer such that the first and second quarter wave plates are orthogonal.

* * * * *